United States Patent
Nishida et al.

(10) Patent No.: US 11,913,097 B2
(45) Date of Patent: Feb. 27, 2024

(54) Fe—Al-BASED ALLOY VIBRATION-DAMPING COMPONENT AND METHOD FOR MANUFACTURING SAME

(71) Applicant: Proterial, Ltd., Tokyo (JP)

(72) Inventors: Junichi Nishida, Tokyo (JP); Kousuke Kuwabara, Tokyo (JP)

(73) Assignee: Proterial, Ltd., Tokyo (JP)

( * ) Notice: Subject to any disclaimer, the term of this patent is extended or adjusted under 35 U.S.C. 154(b) by 109 days.

(21) Appl. No.: 17/613,474

(22) PCT Filed: May 22, 2020

(86) PCT No.: PCT/JP2020/020422
§ 371 (c)(1),
(2) Date: Nov. 22, 2021

(87) PCT Pub. No.: WO2020/241530
PCT Pub. Date: Dec. 3, 2020

(65) Prior Publication Data
US 2022/0220594 A1     Jul. 14, 2022

(30) Foreign Application Priority Data
May 31, 2019   (JP) ................................ 2019-102725

(51) Int. Cl.
*C22C 38/06*     (2006.01)
*B33Y 10/00*     (2015.01)
(Continued)

(52) U.S. Cl.
CPC .............. *C22C 38/06* (2013.01); *B22F 10/25* (2021.01); *B22F 10/64* (2021.01); *B33Y 10/00* (2014.12);
(Continued)

(58) Field of Classification Search
CPC ....................................................... C22C 38/06
See application file for complete search history.

(56) References Cited

U.S. PATENT DOCUMENTS

2020/0108463 A1*   4/2020  Perigo ................. H01F 41/0206

FOREIGN PATENT DOCUMENTS

| CN | 101115850 | 1/2008 |
| CN | 103691741 | 4/2014 |

(Continued)

OTHER PUBLICATIONS

JP2001-059139 English Translation obtained form EPO May 6, 2023. (Year: 2023).*

(Continued)

*Primary Examiner* — Adam Krupicka
(74) *Attorney, Agent, or Firm* — JCIPRNET

(57) ABSTRACT

Provided is a Fe—Al-based alloy vibration-damping component including 4.0 to 12.0% by mass of Al with the balance being Fe and inevitable impurities, having an average crystal grain size in the range of over 700 μm to 2,000 μm and a sectional defect rate of lower than 0.1%, and having an irregular sectional shape. Also provided is a method for manufacturing a Fe—Al-based alloy vibration-damping component. The method obtains a vibration-damping component having an irregular sectional shape, and includes a shaping step in which metal powder including 4.0 to 12.0% by mass of Al with the balance being Fe and inevitable impurities is melted and solidified using a heat source with a scanning rate set to 700 to 1700 mm/second to obtain a shaped product and an annealing step in which the shaped product is annealed at a temperature of 800 to 1200° C.

2 Claims, 8 Drawing Sheets

(51) Int. Cl.
  *B33Y 70/00* (2020.01)
  *B22F 10/64* (2021.01)
  *B33Y 80/00* (2015.01)
  *B33Y 40/20* (2020.01)
  *B22F 10/25* (2021.01)

(52) U.S. Cl.
  CPC .............. *B33Y 40/20* (2020.01); *B33Y 70/00* (2014.12); *B22F 2301/35* (2013.01); *B33Y 80/00* (2014.12)

(56) References Cited

FOREIGN PATENT DOCUMENTS

| CN | 104169027 | 11/2014 |
|---|---|---|
| JP | H08120394 | 5/1996 |
| JP | 2001059139 | 3/2001 |
| JP | 2014080676 | 5/2014 |
| JP | 2014114468 | 6/2014 |
| WO | 2013150972 | 10/2013 |
| WO | 2017030064 | 2/2017 |

OTHER PUBLICATIONS

English Translation of WO2017030064A1 from EPO espacenet obtained Nov. 18, 2023 (Year: 2023).*

"Office Action of China Counterpart Application", dated Jan. 19, 2023, with English translation thereof, pp. 1-.13.

"International Search Report (Form PCT/ISA/210) of PCT/JP2020/020422," dated Jul. 28, 2020, with English translation thereof, pp. 1-4.

"Office Action of German Counterpart Application", dated Jul. 4, 2023, with English translation thereof, p. 1-p. 6.

* cited by examiner

Fe—Al-BASED ALLOY VIBRATION-DAMPING COMPONENT AND METHOD FOR MANUFACTURING SAME

CROSS-REFERENCE TO RELATED APPLICATION

This application is a 371 application of the International PCT application serial no. PCT/JP2020/020422, filed on May 22, 2020, which claims the priority benefits of Japan Patent Application No. 2019-102725, filed on May 31, 2019. The entirety of each of the above-mentioned patent applications is hereby incorporated by reference herein and made a part of this specification.

TECHNICAL FIELD

The present invention relates to a Fe—Al-based alloy vibration-damping component and a method for manufacturing the same.

RELATED ART

As a vibration countermeasure to improve the quietness of a vehicle such as an automobile or to improve the finishing precision in a cutting machine or the like, a metal material having excellent vibration-damping properties is required. The vibration-damping alloy includes, for example, Fe—Al-based alloys, Fe—Cr—Al-based alloys, and Fe—Co—V-based alloys, which are known as ferromagnetic type vibration-damping alloys. All of the above alloys are materials having large magnetostriction. A magnetic domain wall in the material is moved by the magnetostriction corresponding to the magnitude of a strain caused by vibration, and thereby an elastic energy of the vibration is absorbed. Other vibration-damping alloys include Mn—Cu-based alloys, which utilize twinning deformation in thermoelastic martensitic transformation, and loses the vibration-damping effect when the temperature is above a transformation temperature. The ferromagnetic type has a vibration-damping effect even at a relatively high temperature, and in particular, the Fe—Al-based alloy is known as a vibration-damping alloy having low raw material cost and excellent vibration-damping properties.

The Fe—Al-based alloy is often used as a plate after being subjected to plastic working such as rolling or the like. For example, Patent literature 1 (Japanese Patent Laid-Open No. 2014-80676) discloses a manufacturing process of a cold-rolled material having a thickness of 1.4 mm or less, and Patent literature 2 (Japanese Patent Laid-Open No. 2014-114468) discloses plastic working by hot working and a cold working process for cold rolling.

As for the average crystal grain size of these plastic-worked materials, because the crystal grain boundary hinders the movement of the magnetic domain wall, the larger the crystal grain, the larger the magnetostriction, which increases internal friction. In Patent literature 3 (Japanese Patent Laid-Open No. 2001-59139), the average crystal grain size is specified to be within the range of 300 μm to 700 μm. An upper limit is set because if the crystal grain size is excessively large, there is concern that the cold workability is reduced and the strength required for a structural material is also reduced.

Meanwhile, in order to further enhance the vibration-damping effect of a vibration-damping component as described above, a complex shape, for example, a shape in which a space is arranged inside the component tends to be required. The method for manufacturing a component having such a complex shape includes an additive manufacturing method in which metal powder is locally melted and solidified by a laser or the like, and a structure can be shaped into any shape. A process that does not involve plastic working, such as the additive manufacturing method, has a high degree of freedom in design, and is expected to exert a greater vibration-damping effect by being combined with a vibration-damping material.

CITATION LIST

Patent Literature

Patent literature 1: Japanese Patent Laid-Open No. 2014-80676
Patent literature 2: Japanese Patent Laid-Open No. 2014-114468
Patent literature 3: Japanese Patent Laid-Open No. 2001-59139

SUMMARY OF INVENTION

Technical Problem

However, it is considered that when a rapid melting and rapid solidification process such as the additive manufacturing method as described above is applied, minute defects and inclusions are likely to be generated inside the component, which may hinder the movement of the magnetic domain wall that serves as a vibration-damping mechanism and make it unlikely to obtain a sufficient vibration-damping effect. Patent literatures 1 to 3 do not describe the above-mentioned problems, and there is still room for further study. Therefore, an object of the present invention is to provide a Fe—Al-based alloy vibration-damping component that has few solidification defects and is advantageous in improving vibration-damping characteristics even in the presence of remaining minute defects, and provide a method for manufacturing the Fe—Al-based alloy vibration-damping component.

Solution to Problem

As a result of diligent studies on solidified structures, the present inventor has found a range of the crystal grain size in which the vibration-damping characteristics do not deteriorate and a rapid melting and rapid solidification process for obtaining this crystal grain size, and the present invention is attained.

That is, one aspect of the present invention is a Fe—Al-based alloy vibration-damping component that includes 4.0 to 12.0% by mass of Al with the balance being Fe and inevitable impurities, has an average crystal grain size in the range of over 700 μm to 2000 μm and a sectional defect rate of lower than 0.1%, and has an irregular sectional shape.

Another aspect of the present invention is a method for manufacturing a Fe—Al-based alloy vibration-damping component. The method obtains a vibration-damping component having an irregular sectional shape, and includes a shaping step in which metal powder including 4.0 to 12.0% by mass of Al with the balance being Fe and inevitable impurities is melted and solidified using a heat source with a scanning rate set to 700 mm/s to 1700 mm/s to obtain a shaped product and an annealing step in which the shaped product is annealed at a temperature of 800 to 1200° C.

Effects of Invention

According to the present invention, it is possible to provide a Fe—Al-based alloy vibration-damping component that has few solidification defects and is advantageous in improving vibration-damping characteristics even in the presence of remaining minute defects.

DESCRIPTION OF EMBODIMENTS

Hereinafter, an embodiment of the present invention is specifically described.

A Fe—Al-based alloy vibration-damping component (hereinafter, also simply referred to as vibration-damping component) of the present invention includes 4.0 to 12.0% by mass of Al, with the balance being Fe and inevitable impurities. Al dissolves in Fe and increases magnetostriction, which contributes to vibration-damping properties. As Al increases, magnetostriction becomes larger, and reaches a maximum at about 10%. On the other hand, the magnetic permeability decreases as Al increases, and a magnetic domain wall becomes difficult to move. For these reasons, Al is set to 4.0 to 12.0%. A preferred lower limit is 6.0% and a preferred upper limit is 10.0%.

The main feature of the vibration-damping component of the present embodiment is that the average crystal grain size is in the range of over 700 μm to 2000 μm. In a conventional manufacturing method including plastic working such as rolling, high vibration-damping characteristics have been obtained by setting the average crystal grain size to about 300 to 500 μm. However, it has been found that, because minute solidification defects and inclusions are inevitably generated in a component manufactured by an additive manufacturing method, even if the crystal grains are controlled to be the same, the movement of the magnetic domain wall is hindered by the minute inclusions and solidification defects, which causes the vibration-damping characteristics to be lower than that of a conventional plastic worked product. By controlling the average crystal grain size of the vibration-damping component of the present embodiment to exceed 700 μm, the movement of the magnetic domain wall is less likely to be hindered even in the presence of the above-mentioned minute solidification defects and inclusions, and vibration-damping characteristics equal to or better than that of the conventional product can be exhibited. On the other hand, if the average crystal grain size becomes excessively large, the ductility of the vibration-damping component tends to decrease, and thus the upper limit is set to 2000 μm. The lower limit of the average crystal grain size is preferably 800 μm, and more preferably 900 μm. In addition, the upper limit of the average crystal grain size is preferably 1800 μm, more preferably 1600 μm, further preferably 1400 μm, and particularly preferably 1200 μm. Moreover, if there are too many defects, sufficient vibration-damping characteristics cannot be obtained even if the vibration-damping component has the average crystal grain size described above. Thus, the sectional defect rate is set to less than 0.1%. Further, the sectional defect rate can be measured by, for example, mirror-polishing a section (a transverse section if the component has a long shape) parallel to a thickness direction of the component, observing with an optical microscope, and analyzing the obtained image.

Figure 8:
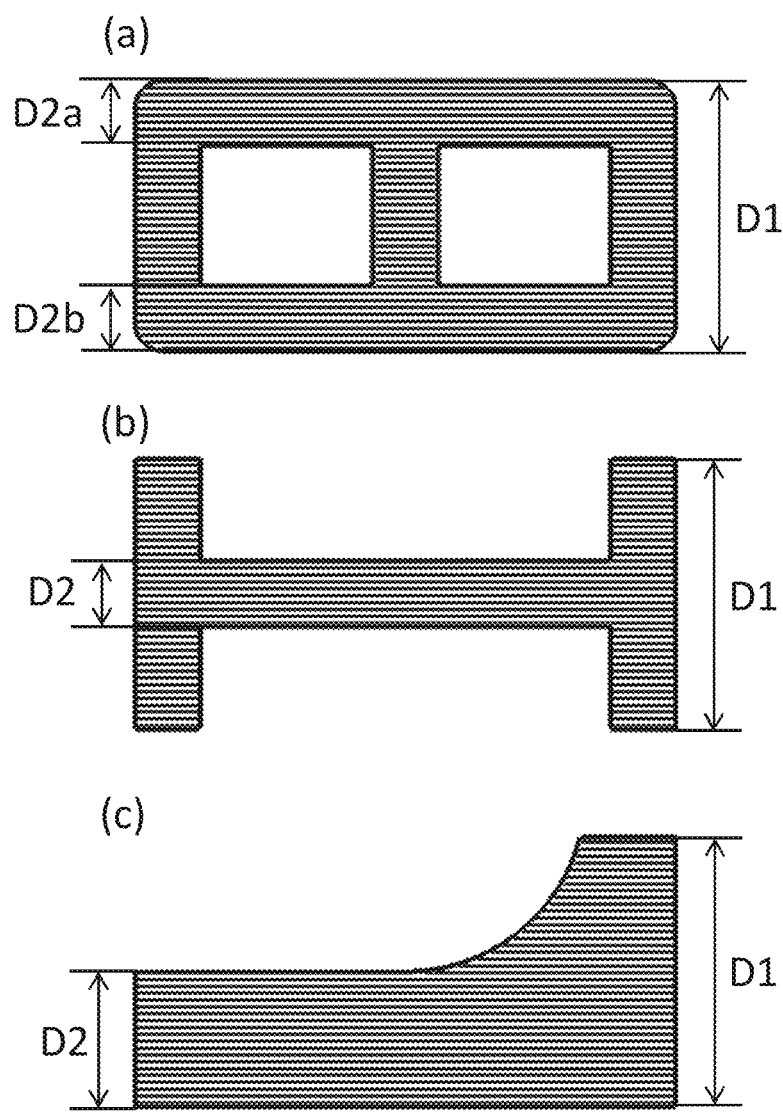
FIG. 8 is a reference diagram for illustrating an irregular sectional shape.

The vibration-damping component of the present embodiment has an irregular sectional shape. That is, the vibration-damping component has portions having different thicknesses in either or both of the longitudinal direction and the thickness direction. Furthermore, when a long diameter of the section in the thickness direction is set as D1 and a short diameter is set as D2, it is preferable to have an irregular sectional shape in which a difference between D1 and D2 is 0.5 mm or more. FIG. 8 shows examples of the irregular sectional shape. The irregular sectional shape of the present embodiment refers to, for example, the shape of the transverse section of a long component, including a shape as shown in (a) of FIG. 8 in which a hollow portion is formed in the section, an H-shape as shown in (b) of FIG. 8, and a shape as shown in (c) of FIG. 8 in which the thickness of the sectional shape changes. Moreover, in the case of the shape as shown in (a) of FIG. 8 in which a hollow portion is formed in the section, the short diameter D2 is a thickness (D2$a$+D2$b$) excluding the hollow portion.

Subsequently, the manufacturing method of the present embodiment is described. In the manufacturing method of the present embodiment, a shaping step is performed in which metal powder including 4.0 to 12.0% by mass of Al with the balance being Fe and inevitable impurities is melted and solidified using a heat source with a scanning rate set to 700 mm/s to 1700 mm/s to obtain a shaped product. The alloy powder manufactured by a commonly used powder manufacturing method can be used. For example, an atomizing method, a melt spinning method, or the like can be used.

As a means of melting and solidifying the powder in the present embodiment, a generally known powder additive manufacturing method may be applied. The powder additive manufacturing method includes, for example, a powder bed method, a direct metal deposition method, and the like. The heat source can be appropriately selected from laser, electron beam, arc, plasma, and the like. Moreover, in the present embodiment, the powder bed method using laser as the heat source is selected.

The main feature of the manufacturing method of the present embodiment is that the scanning rate of the heat source is set to 700 mm/s to 1700 mm/s in the shaping step in which the metal powder is melted and solidified to obtain a shaped product. When observing the shaped product after the shaping step, the average crystal grain size is about 100 to 300 μm. However, in order to make the shaped product into coarse crystal grains having an average crystal grain size exceeding 700 μm by annealing, it is necessary to leave an appropriate internal strain in the shaped product. The internal strain is introduced by thermal stress generated by rapid heating and rapid cooling and transformation stress associated with phase transformation, and the magnitude of the internal strain is used as a driving force to cause recrystallization. When the scanning rate is slow and the solidification progresses slowly, the strain accumulated inside becomes small, and the crystal grains (equiaxed grains of about 100 to 300 µm) at the time of solidification do not recrystallize even when annealed and tend to remain as they are. Therefore, in the present embodiment, the scanning rate of the heat source is set to 700 mm/s or more. A preferred scanning rate is 800 mm/s or more. On the other hand, when the scanning rate is accelerated and the solidification rate is increased, the internal strain becomes large, but the generation sites being the nuclei of recrystallization increase, and the recrystallized grains tend to become fine. In addition, when the solidification rate is increased, the solidification defects also increase, which may hinder the growth of recrystallization and reduce the strength of the shaped product. Therefore, in the present embodiment, the scanning rate is set to 1700 mm/s or less. A preferred scanning rate is 1600 mm/s or less, and a more preferred scanning rate is 1500 mm/s or less.

In addition, in the manufacturing method of the present embodiment, it is preferable to set the energy density of the heat source to 65 to 135 J/mm$^3$ while satisfying the scanning rate of the heat source described above. The energy density is calculated by $P/(v \cdot p \cdot d)$ when an output of the scanning heat source is set as P, the scanning rate is set as v, a scanning interval is set as p, and a lamination thickness per layer is set as d. By melting and solidifying the metal powder within the energy density range described above, coarse crystal grains can be stably obtained after annealing.

Figure 1:
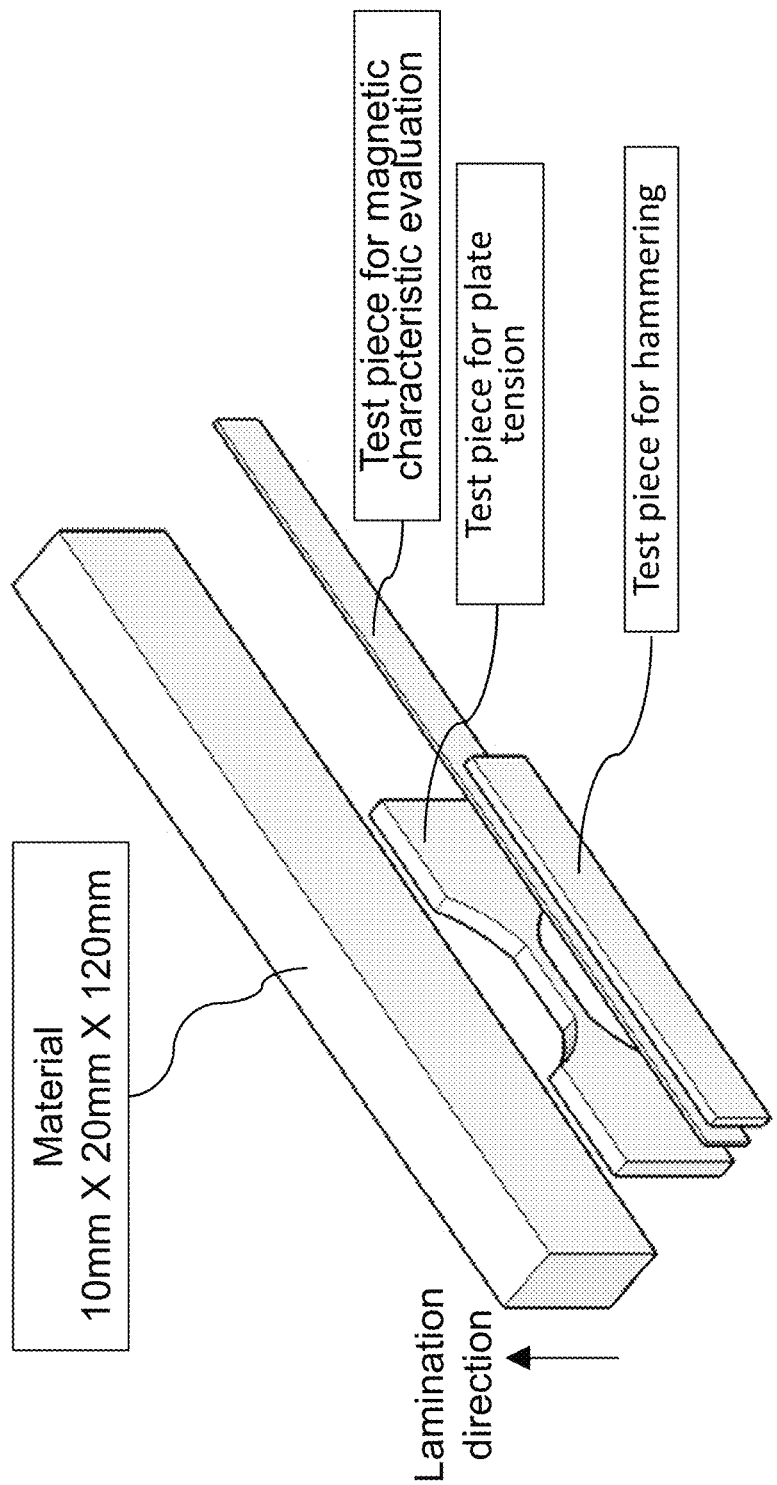
FIG. 1 is a schematic diagram for illustrating a method for collecting a test piece in an example.

The shaped product of the present embodiment has a metal structure that consists of a set of rapidly solidified structures. The microstructure has a columnar structure along the lamination direction. The columnar structure is mainly composed of crystal orientations of (110) and (200), and the total ratio is preferably 90% or more, and more preferably 95% or more. Accordingly, it is considered that the microstructure after annealing becomes coarser. In addition, it is preferable that the shaped product of the present embodiment has a large number of crystal grains having a grain orientation spread (GOS) value of 3° or more. The GOS value indicates a value obtained by averaging an orientation difference between an arbitrary measurement point and another measurement point in the same crystal grain. For example, in the above columnar structure along the lamination direction (in the case of FIG. 1, a sectional structure parallel to the thickness direction), the number of crystal grains having a GOS value of 3° or more is 100 grains/mm$^2$, and more preferably 150 grains/mm$^2$.

In the manufacturing method of the present embodiment, the shaped product before annealing may be subjected to a hot isotropic pressure pressurization treatment of 50 MPa to 300 MPa at a temperature of 1100° C. to 1300° C. Accordingly, an effect of reducing internal defects and further improving the performance of the vibration-damping component can be expected.

In the manufacturing method of the present embodiment, annealing is performed on the obtained shaped product. The reason is that if the shaped product is left as it is, only crystal grains of about 300 µm can be obtained, so that it is necessary to coarsen the crystal grains by annealing and recrystallizing the shaped product. A state in which thermal stress remains due to rapid solidification is effective, but heating at 800° C. or higher is required for recrystallization. The heating temperature is preferably 900° C. or higher. Because the growth of the crystal grains becomes slow and the heat treatment deformation becomes large when the heating temperature exceeds 1200° C., the upper limit is set to 1200° C.

Although the embodiment of the present invention has been described above in detail, the present invention is not limited to the above-described embodiment, and various modifications can be made without departing from the spirit of the present invention described in the claims. For example, a processing step such as cutting may be performed on the annealed component to improve the shape precision.

Examples

Gas atomized powder of a composition consisting of 6.43%, 8.32%, and 10.40% by mass of Al with the balance being Fe and inevitable impurities was prepared and classified into 10 to 53 µm. Gas atomization was carried out by melting at high frequency in a vacuum, dropping the molten alloy from a nozzle with a diameter of 5 mm under a crucible, and spraying with high-pressure argon. The sprayed alloy was used as raw material powder, and a long shaped product (FIG. 1) having a width of 10 mm, a length of 120 mm, and a lamination height of 20 mm was manufactured using a three-dimensional additive manufacturing machine (manufactured by EOS, EOS-M290) with S45C as a base plate. The long shaped product was manufactured by high-speed melting and rapid solidification by laser irradiation using the powder bed method. The lamination thickness per layer was 40 µm, and the irradiation direction was rotated by 67° for each layer. The beam diameter of the laser was about 0.1 mm, and the laser output was adjusted at 200 to 350 W. The shaping conditions are shown in Table 1. The types of powder are denoted by A, B, and C, and the Al contents correspond to 6.43%, 8.32%, and 10.40%, respectively. The annealing was carried out by heating and holding in a hydrogen stream for 30 minutes at the annealing temperature shown in Table 1, and then cooling at about 100° C./min.

Subsequently, the structure was observed and various characteristics were measured. For the two types of microstructures before and after annealing, the sections parallel to the thickness direction (lamination direction) were observed. Specifically, the transverse section of the long shape shown in FIG. 1 was mirror-polished and observed with an optical microscope (magnification: 200 times, measurement range: 10 mm$^2$). The obtained image was analyzed using an image processing software ImageJ, and the defect rate was determined as the area ratio of black defects in the microstructure after annealing.

The crystal grain size was calculated by observing the sample after annealing with an optical microscope (magnification: 100 times) in the above transverse section, drawing a line segment of 3 mm perpendicular to the thickness direction, and counting the intersection points with the crystal grain boundary. At this time, 10 line segments were arbitrarily drawn in a manner of not intersecting with the same crystal grain, and the average value was used as the average crystal grain size. The results are shown in Table 1. For the various characteristics, a strip test piece (thickness: 1.5 mm, width: 10 mm, length: 60 mm) for hammering for use in damping ratio measurement, a thin plate test piece (thickness: 0.6 mm, width: 8 mm, length: 120 mm) for magnetic characteristic evaluation, and a tensile test piece (parallel portion: 2.6 mm square, length: 11 mm) were collected from the shaped product in the direction shown in FIG. 1. Each of the collected samples was evaluated after being annealed at the annealing temperature shown in Table 1.

In the hammering test, 25 mm on one side was fixed with a vise, a protrusion length was set to 35 mm, an acceleration sensor was attached to the front end of the plane, and the width side surface was struck with a force of about 50 N using an impulse hammer to measure the damping characteristics (resonance frequency, damping ratio).

The magnetic permeability was measured by setting an effective magnetic path length to about 90 mm, applying a magnetic field of 4000 A/m with a primary coil, and measuring an excited magnetic flux with a secondary coil, in accordance with a single sheet test (direct current).

A tensile test was carried out at room temperature in accordance with JIS-Z-2241 (2011), and tensile strength and elongation were measured. Table 2 shows the measurement results of various characteristics.

TABLE 2

| No | Resonance frequency [Hz] | Damping ratio | Magnetic permeability | Tensile strength [MPa] | Elongation [%] |
|---|---|---|---|---|---|
| 1  | 414 | 0.19 | 6750 | 445 | 14 |
| 2  | 365 | 0.20 | 4400 | 534 | 9.8 |
| 3  | 381 | 0.19 | 4200 | 532 | 9.1 |
| 4  | 443 | 0.15 | 3970 | 537 | 10 |
| 5  | 475 | 0.13 | 2710 | 572 | 1.5 |
| 6  | 510 | 0.18 | 7220 | 440 | 12 |
| 7  | 389 | 0.19 | 4250 | 545 | 9.5 |
| 8  | 402 | 0.19 | 4380 | 541 | 9.0 |
| 11 | 553 | 0.04 | 6120 | 455 | 18 |
| 12 | 575 | 0.04 | 2110 | 598 | 14 |
| 13 | 560 | 0.03 | 1850 | 652 | 1.2 |
| 14 | 461 | 0.05 | 2790 | 578 | 14 |
| 15 | 643 | 0.02 | 1790 | 626 | 0.7 |
| 16 | 432 | 0.03 | 6540 | 401 | 5.3 |
| 17 | 418 | 0.08 | 4680 | 515 | 3.2 |
| 18 | 428 | 0.06 | 2470 | 585 | 0.8 |
| 19 | 438 | 0.08 | 2360 | 391 | 1.7 |
| 20 | 451 | 0.04 | 1740 | 446 | 0.4 |

TABLE 1

| No | Al amount | Scanning rate [mm/s] | Output [W] | Scanning pitch [mm] | Energy density [J/mm³] | Annealing temperature [° C.] | Defect rate [%] | Crystal grain size [µm] | Remarks |
|---|---|---|---|---|---|---|---|---|---|
| 1  | A | 1000 | 300 | 0.07 | 107 | 1000° C. | 0    | 880  | Example of the present invention |
| 2  | B | 1000 | 300 | 0.07 | 107 | 1000° C. | 0.02 | 1175 | Example of the present invention |
| 3  | B | 1000 | 350 | 0.09 | 97  | 1100° C. | 0.04 | 910  | Example of the present invention |
| 4  | B | 800  | 250 | 0.07 | 112 | 1150° C. | 0    | 780  | Example of the present invention |
| 5  | C | 800  | 250 | 0.07 | 112 | 1100° C. | 0.05 | 740  | Example of the present invention |
| 6  | A | 1200 | 350 | 0.07 | 104 | 900° C.  | 0.01 | 930  | Example of the present invention |
| 7  | B | 1200 | 350 | 0.07 | 104 | 1000° C. | 0.04 | 960  | Example of the present invention |
| 8  | B | 1400 | 350 | 0.07 | 89  | 1100° C. | 0.08 | 1120 | Example of the present invention |
| 11 | A | 600  | 200 | 0.09 | 93  | 900° C.  | 0    | 120  | Comparative example |
| 12 | B | 600  | 200 | 0.09 | 93  | 1000° C. | 0    | 90   | Comparative example |
| 13 | C | 600  | 200 | 0.09 | 93  | 1000° C. | 0.13 | 120  | Comparative example |
| 14 | B | 600  | 300 | 0.09 | 139 | 1000° C. | 0.09 | 150  | Comparative example |
| 15 | C | 600  | 300 | 0.09 | 139 | 1000° C. | 0.21 | 160  | Comparative example |
| 16 | A | 1750 | 300 | 0.07 | 61  | 900° C.  | 0.32 | 280  | Comparative example |
| 17 | B | 1750 | 300 | 0.07 | 61  | 1000° C. | 0.18 | 500  | Comparative example |
| 18 | C | 1750 | 300 | 0.07 | 61  | 1000° C. | 0.2  | 440  | Comparative example |
| 19 | B | 1750 | 200 | 0.09 | 32  | 1000° C. | 5.38 | 160  | Comparative example |
| 20 | A | 1750 | 200 | 0.09 | 32  | 1000° C. | 4.94 | 190  | Comparative example |

From the results in Table 1, the examples of the present invention of No. 1 to No. 8 in which the scanning rate was within the range of 800 to 1700 mm/s had an average crystal grain size of more than 700 μm after annealing and a defect rate of less than 0.1%. In the hammering test, the damping ratio was 0.1 or more in the resonance frequency range of 300 to 500 Hz. The damping ratio of a conventional rolled material containing 6 to 10% by mass of Al after annealing was in the range of 0.13 to 0.2 by the same test method. Thus, it can be confirmed that almost the same damping characteristics were obtained. In particular, it was confirmed that No. 1 to No. 3 and No. 6 to No. 8 in which the average crystal grain size was 800 μm or more had a damping ratio of 0.18 to 0.19, which is at a high level among the examples of the present invention.

Figure 2:
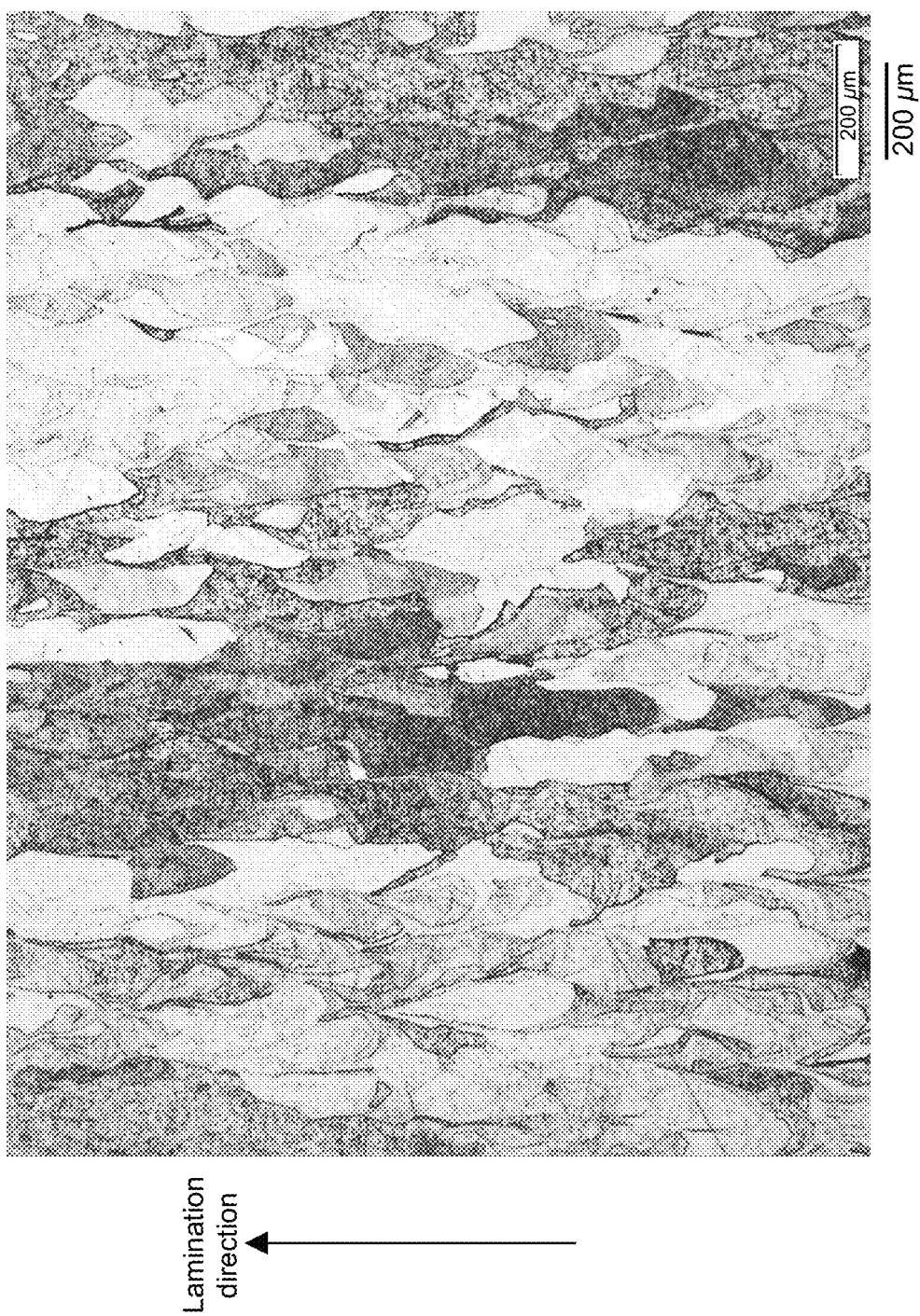
FIG. 2 is a sectional photograph of an example of the present invention before annealing.
Figure 3:
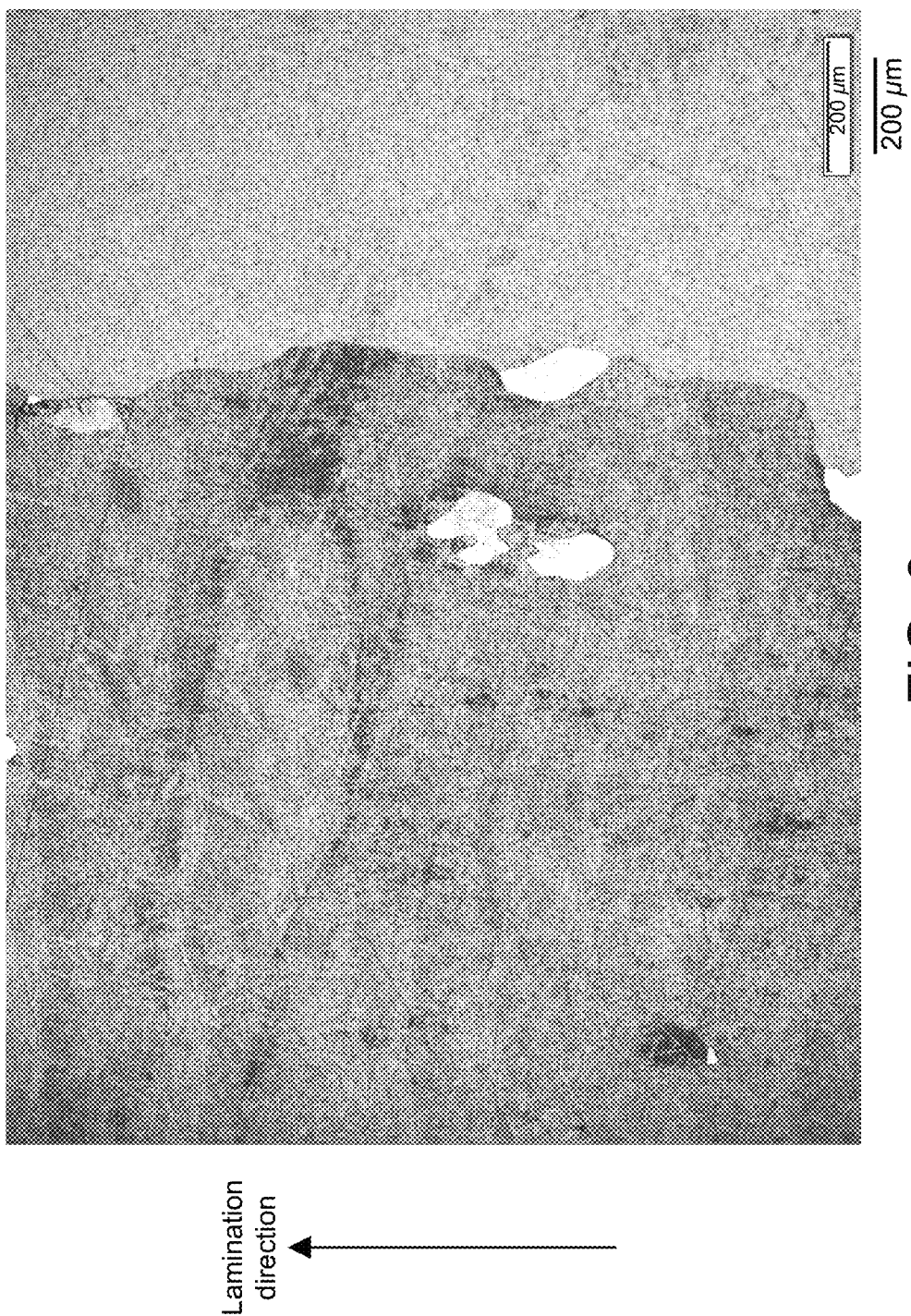
FIG. 3 is a sectional photograph of an example of the present invention after annealing.

As typical examples, FIGS. 2 and 3 show the microstructures of No. 2 before and after annealing, respectively. Before annealing, columnar crystal grains grown in the lamination direction were observed, and the width was about 100 μm. After annealing at 1000° C., coarse recrystallized grains of about 1000 μm were obtained. Similarly, in other examples of the present invention, recrystallization was performed by annealing, and recrystallized grains of more than 700 μm were obtained.

Figure 4:
FIG. 4 is a sectional photograph of a comparative example before annealing.
Figure 5:
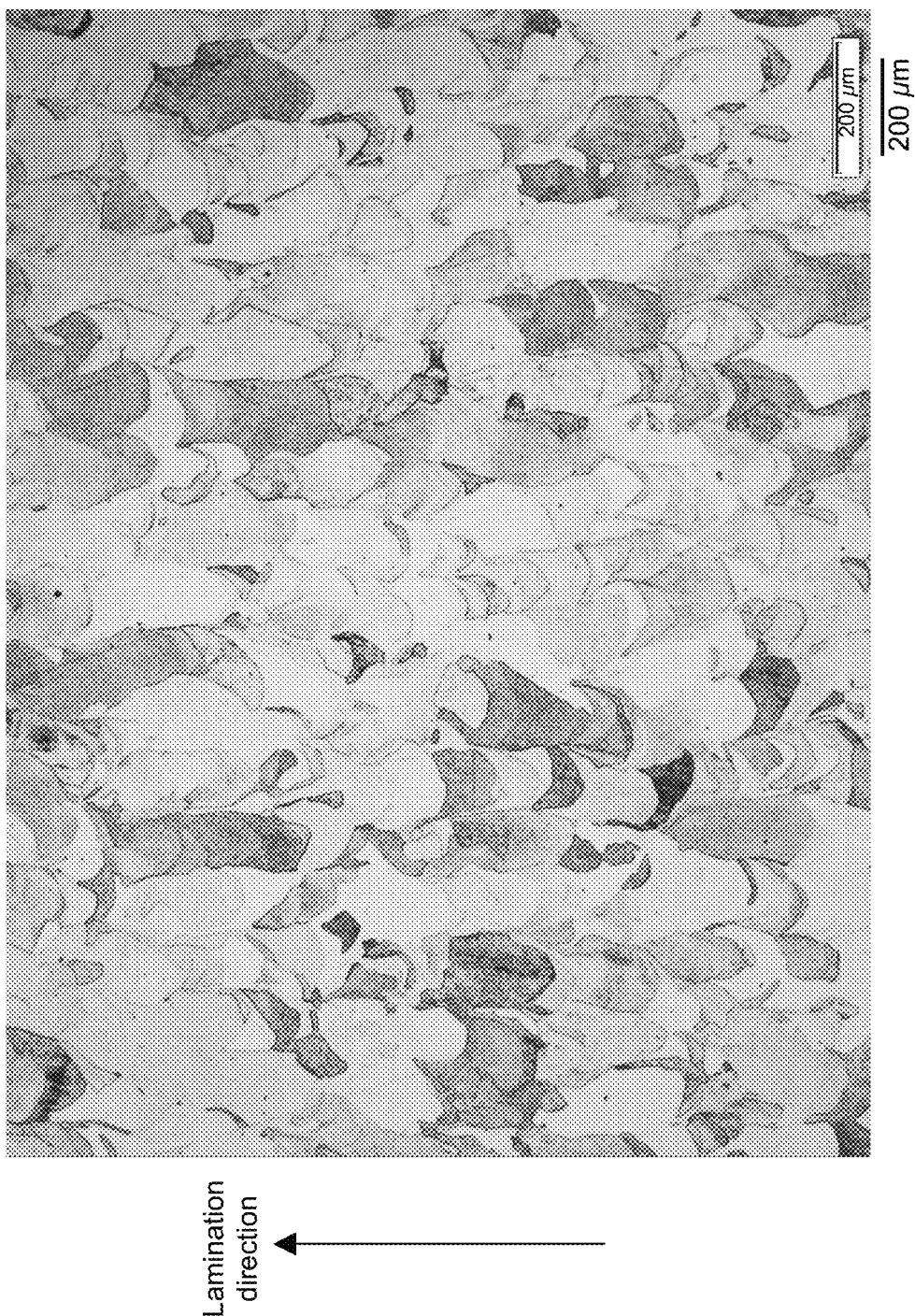
FIG. 5 is a sectional photograph of a comparative example after annealing.

Comparative examples of No. 11 to No. 15 had a scanning rate of 600 mm/s, which was sometimes slower than that of the examples of the present invention, almost no recrystallization occurred after annealing, and the average crystal grain size was about 100 to 150 μm. FIGS. 4 and 5 show the microstructures of No. 12 before and after annealing, respectively. Equiaxial crystal grains were obtained before annealing, and almost no change was observed in the crystal grains after annealing. The tensile strength was higher than that of the examples of the present invention partly due to the influence of the fine crystal grains, but the damping ratios were all 0.1 or less.

Figure 6:
FIG. 6 is a sectional photograph of another comparative example before annealing.
Figure 7:
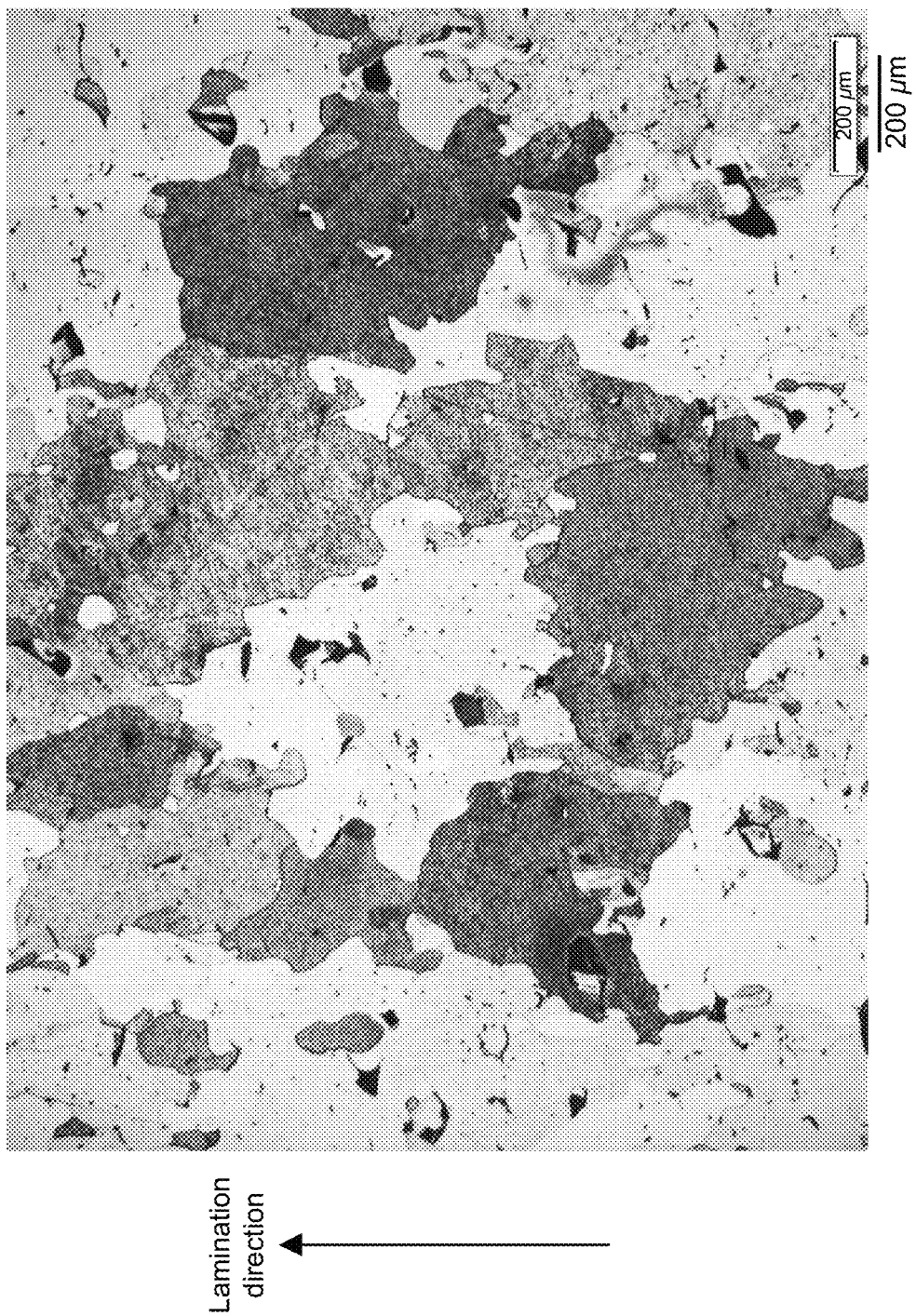
FIG. 7 is a sectional photograph of another comparative example after annealing.

It was confirmed that in comparative examples of No. 16 to No. 20, when the scanning rate was as high as 1750 mm/s, there were many defects before annealing, the defect rates were all over 0.1, and the crystal grain size was small although recrystallization was performed after annealing. FIGS. 6 and 7 show the microstructures of No. 19 before and after annealing, respectively. Before annealing, the structure had many defects and was dispersed, and after annealing, the structure was recrystallized, but the crystal grain size was small. Therefore, the vibration-damping components in the comparative example are more likely to have low strength and ductility and reduced corrosion resistance.

INDUSTRIAL APPLICABILITY

According to the Fe—Al-based alloy vibration-damping component and the method for manufacturing the same of the present invention, it is possible to manufacture a three-dimensionally shaped component having an irregular sectional shape. Therefore, by combining the excellent vibration-damping characteristics of the Fe—Al-based alloy material with the shape design, the vibration-damping characteristics are enhanced, and the present invention can be applied to components of a vehicle such as an automobile and components of a processing machine or the like that require higher quietness and vibration countermeasures.

What is claimed is:

1. A Fe—Al-based alloy vibration-damping component comprising:
    4.0 to 12.0% by mass of Al, with the balance being Fe and inevitable impurities, and
    having an average crystal grain size in a range of over 740 μm to 2000 μm and a sectional defect rate of lower than 0.1%, and having an irregular sectional shape.

2. A method for manufacturing a Fe—Al-based alloy vibration-damping component, obtaining a vibration-damping component having an irregular sectional shape, the method comprising:
    a shaping step in which metal powder comprising 4.0 to 12.0% by mass of Al with the balance being Fe and inevitable impurities is melted and solidified using a heat source with a scanning rate set to 700 mm/s to 1700 mm/s to obtain a shaped product; and
    an annealing step in which the shaped product is annealed at a temperature of 800 to 1200° C. to obtain the vibration-damping component having an average crystal grain size in a range of over 740 μm to 2000 μm.

* * * * *